United States Patent
Harada (10) Patent No.: US 11,772,351 B2
(45) Date of Patent: Oct. 3, 2023

(54) PRESS MACHINE AND METHOD FOR DIAGNOSING ABNORMALITY PRESS MACHINE

(71) Applicant: AIDA ENGINEERING, LTD., Kanagawa (JP)

(72) Inventor: Yasuhiro Harada, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 0 days.

(21) Appl. No.: 17/887,780

(22) Filed: Aug. 15, 2022

(65) Prior Publication Data
US 2023/0065386 A1    Mar. 2, 2023

(30) Foreign Application Priority Data
Aug. 27, 2021 (JP) ................... 2021-138858

(51) Int. Cl.
| | |
|---|---|
| *B30B 15/28* | (2006.01) |
| *B30B 15/14* | (2006.01) |
| *G05B 23/02* | (2006.01) |
| *B30B 15/26* | (2006.01) |

(52) U.S. Cl.
CPC ............ *B30B 15/28* (2013.01); *B30B 15/14* (2013.01); *B30B 15/148* (2013.01); *B30B 15/26* (2013.01); *G05B 23/0235* (2013.01)

(58) Field of Classification Search
CPC ....... B30B 15/28; B30B 15/148; B30B 15/26; B30B 15/14; G05B 23/0235
See application file for complete search history.

(56) References Cited

U.S. PATENT DOCUMENTS

| | | | | |
|---|---|---|---|---|
| 4,339,749 A | * | 7/1982 | Yamada | B23Q 11/00 340/686.1 |
| 4,480,538 A | * | 11/1984 | Yoshida | B30B 15/14 100/282 |
| 6,114,965 A | | 9/2000 | Schoch | |
| 6,466,840 B1 | | 10/2002 | Schoch | |
| 6,484,106 B1 | | 11/2002 | Schoch | |

(Continued)

FOREIGN PATENT DOCUMENTS

| | | |
|---|---|---|
| JP | 10-277798 A | 10/1998 |
| JP | H11-320198 A | 11/1999 |

(Continued)

OTHER PUBLICATIONS

Extended European Search Report issued in corresponding European Application No. 22191796.6, dated Jan. 18, 2023 (14 pages).

*Primary Examiner* — John A Tweel, Jr.
(74) *Attorney, Agent, or Firm* — McDermott Will & Emery LLP (57) ABSTRACT

A press machine includes: a press control unit that controls ascending/descending motion of the slide; and an abnormality diagnostic unit configured to perform abnormality diagnosis of the press machine based on data from a sensor provided in the press machine and to output a result of the abnormality diagnosis. The abnormality diagnostic unit is configured to perform the abnormality diagnosis, based on the data acquired from the sensor while the slide moves at a predetermined speed between a bottom dead point and a top dead point in a press-no-load state.

7 Claims, 6 Drawing Sheets

(56) References Cited

U.S. PATENT DOCUMENTS

| | | | |
|---|---|---|---|
| 7,187,996 B2* | 3/2007 | Tanaka | B30B 15/14 |
| | | | 700/165 |
| 9,156,222 B2* | 10/2015 | Douba | B30B 1/26 |
| 9,586,375 B2* | 3/2017 | Yamanouchi | B30B 15/26 |
| 10,081,150 B2* | 9/2018 | Douba | B30B 1/263 |
| 11,235,545 B2* | 2/2022 | Kurokawa | B30B 15/28 |
| 2003/0018409 A1 | 1/2003 | Schoch | |
| 2006/0054031 A1 | 3/2006 | Beek et al. | |
| 2008/0178676 A1 | 7/2008 | Liasi et al. | |
| 2020/0171774 A1 | 6/2020 | Ishida | |
| 2021/0406705 A1 | 12/2021 | Funabashi et al. | |

FOREIGN PATENT DOCUMENTS

| | | |
|---|---|---|
| JP | 2000-190096 A | 7/2000 |
| JP | 2006-509631 A | 3/2006 |
| WO | 2020/174827 A1 | 9/2020 |

\* cited by examiner

| DIRECTION OF MOVEMENT | DIE | SENSOR | NORMAL-TIME DATA |
|---|---|---|---|
| TOP DEAD POINT TO BOTTOM DEAD POINT | A | MOTOR BEARING | 001 |
| | | SLIDE GUIDE | 002 |
| BOTTOM DEAD POINT TO TOP DEAD POINT | NONE | MOTOR BEARING | 003 |
| | | SLIDE GUIDE | 004 |
| TOP DEAD POINT TO BOTTOM DEAD POINT | NONE | MOTOR BEARING | 005 |
| | | SLIDE GUIDE | 006 |
| BOTTOM DEAD POINT TO TOP DEAD POINT | B | MOTOR BEARING | 007 |
| | | SLIDE GUIDE | 008 |

PRESS MACHINE AND METHOD FOR DIAGNOSING ABNORMALITY PRESS MACHINE

CROSS-REFERENCE TO RELATED APPLICATION

Japanese Patent Application No. 2021-138858, filed on Aug. 27, 2021, is hereby incorporated by reference in its entirety.

BACKGROUND

The present invention relates to a press machine and a method for diagnosing abnormality of the press machine.

When, in a press machine, sliding parts (for example, a bearing of a main motor, a slide guide, or the like) are seized or a frame is cracked, it takes a long time for restoration work (disassembly, repair, and re-assembly), and when the production line is stopped during that time, it will result in a big loss. Thus, both the press manufacturers and the product manufacturers are seeking ways to capture signs of abnormality. In JP 2006-509631 T, JP 2000-190096 A, and JP H11-320198 A, devices for monitoring the operation state of a press based on vibration are disclosed.

These devices measure vibration during production and are intended to monitor failure of a product or die. In the case of a press machine, there is a problem that the vibration generated in a frame due to processing load during production causes a large disturbance, and thus it is difficult to compare with the normal state. In order to bring the press machine into a no-load condition which is the standard for normal operation during production, for example, in the case of a transfer press, a transfer feeder is retracted to a position out of interference with a press, and the materials in all stages are retreated to the outside of a die. Further, a slide adjustment mechanism is driven to adjust the height position of a slide (slide adjustment) so that an upper die and a lower die do not interfere with each other while the slide descends from a top dead point to a bottom dead point, and finally the abnormality diagnosis can be operated. Under this condition, a no-load operation (idle running) is carried out, and the measured vibration is compared with the normal vibration to make an abnormality diagnosis. After the diagnosis is completed, the slide is adjusted to the height position for production, the materials are placed again in each stage, the transfer feeder is moved to the feed start position, and a selector switch is changed so that the operation of the press and the transfer feeder is interlocked. Thus, when the abnormality diagnosis of the press machine is performed under a no-load condition during production, the user's workload becomes excessive.

SUMMARY

The invention provides a press machine which can improve diagnostic accuracy of the abnormality diagnosis without imposing a workload on a user, and a method for diagnosing abnormality of the press machine.

According to a first aspect of the invention, there is provided a press machine that converts a rotation of a motor into a reciprocating linear motion of a slide and performs press working on a workpiece material, the press machine including:

a press control unit that controls ascending/descending motion of the slide; and an abnormality diagnostic unit configured to perform abnormality diagnosis of the press machine based on data from a sensor provided in the press machine and to output a result of the abnormality diagnosis, the abnormality diagnostic unit being configured to perform the abnormality diagnosis, based on the data acquired from the sensor while the slide moves at a predetermined speed between a bottom dead point and a top dead point in a press-no-load state.

According to a second aspect of the invention, there is provided a method for diagnosing abnormality of a press machine that converts a rotation of a motor into a reciprocating linear motion of a slide and performs press working on a workpiece material, the method including:

a press control step of controlling ascending/descending motion of the slide; and an abnormality diagnosis step of performing abnormality diagnosis of the press machine based on data from a sensor provided in the press machine and outputting a result of the abnormality diagnosis, in the abnormality diagnosis step, the abnormality diagnosis being performed based on the data acquired from the sensor while the slide moves at a predetermined speed between a bottom dead point and a top dead point in a press-no-load state.

DESCRIPTION OF EMBODIMENTS (1) According to one embodiment of the invention, there is provided a press machine that converts a rotation of a motor into a reciprocating linear motion of a slide and performs press working on a workpiece material, the method including:

a press control unit that controls ascending/descending motion of the slide; and an abnormality diagnostic unit configured to perform abnormality diagnosis of the press machine based on data from a sensor provided in the press machine and to output a result of the abnormality diagnosis, the abnormality diagnostic unit being configured to perform the abnormality diagnosis based on the data acquired from the sensor while the slide moves at a predetermined speed between a bottom dead point and a top dead point in a press-no-load state.

Here, the press-no-load state means a state in which no processing load is applied to the press machine, that is, a state in which the die is not mounted, or a state in which the members of the upper die and the lower die do not contact each other while the slide moves between the bottom dead point and the top dead point even when the die is mounted.

According to one embodiment of the invention, there is provided a method for diagnosing abnormality of a press machine that converts the rotation of a motor into a reciprocating linear motion of a slide and performs press working on a workpiece material, the method including:

a press control step of controlling ascending/descending motion of the slide; and an abnormality diagnosis step of performing abnormality diagnosis of the press machine based on data from a sensor provided in the press machine and outputting a result of the abnormality diagnosis, in the abnormality diagnosis step, the abnormality diagnosis being performed based on the data acquired from the sensor while the slide moves at a predetermined speed between a bottom dead point and a top dead point in a press-no-load state.

According to the above embodiment, by performing the abnormality diagnosis based on the data acquired while the slide moves between the bottom dead point and the top dead point at a predetermined speed in the press-no-load state, the influence of disturbance may be eliminated and the diagnosis accuracy may be improved without imposing a workload for unloading on a user.

(2) In the press machine according to the above embodiment, the abnormality diagnostic unit may be configured to perform the abnormality diagnosis at the time of die change, based on at least one of:

data acquired from the sensor while the slide, to which a die is attached, moves at a predetermined speed from the top dead point to the bottom dead point;

data acquired from the sensor while the slide, to which no die is attached, moves at a predetermined speed from the bottom dead point to the top dead point;

data acquired from the sensor while the slide, to which no die is attached, moves at a predetermined speed from the top dead point to the bottom dead point; and data acquired from the sensor while the slide, to which a die is attached, moves at a predetermined speed from the bottom dead point to the top dead point.

When the slide moves between the bottom dead point and the top dead point with a die mounted, the members (for example, a gas cushion built into the die, stripper plate, bottom dead point stopper, or the like) of the upper die and the lower die come into contact with each other in the vicinity of the bottom dead point, which may apply a load to the press machine. In this case, the abnormality diagnosis may be performed by automatically adjusting the slide to ascend to the height position where the members of the upper die and the lower die do not come into contact with each other, or excluding data acquired while the members of the upper die and the lower die are in contact with each other.

According to the above embodiment, by performing the abnormality diagnosis by acquiring data from the sensor when the slide moves (the slide is descended to remove the die, the slide is ascended to carry in the next die, the slide is descended to mount the next die, or the slide is ascended to start production) at the time of the die change, the abnormality diagnosis may be performed without imposing a workload on a user.

(3) In the press machine according to the above embodiment, the press control unit may be configured to output an abnormal completion notification to the abnormality diagnostic unit when movement of the slide is not completed normally, and the abnormality diagnostic unit may be configured not to output a result of the abnormality diagnosis when the abnormal completion notification has been received.

According to the above embodiment, the result of the abnormality diagnosis may be prevented from being output in a state where a normal diagnosis is not performed.

(4) In the press machine according to the above embodiment, the abnormality diagnostic unit may be configured to perform the abnormality diagnosis based on:

data previously acquired from the sensor while the slide moved normally between the bottom dead point and the top dead point at a predetermined speed; and data acquired from the sensor at the time of die change.

(5) In the press machine according to the above embodiment, the sensor may be a sensor configured to detect vibration of a bearing of the motor.

(6) In the press machine according to the above embodiment, the sensor may be a sensor configured to detect vibration of a slide guide that guides the slide.

Hereinafter, embodiments of the invention will be described in detail with reference to the drawings.

Figure 1:
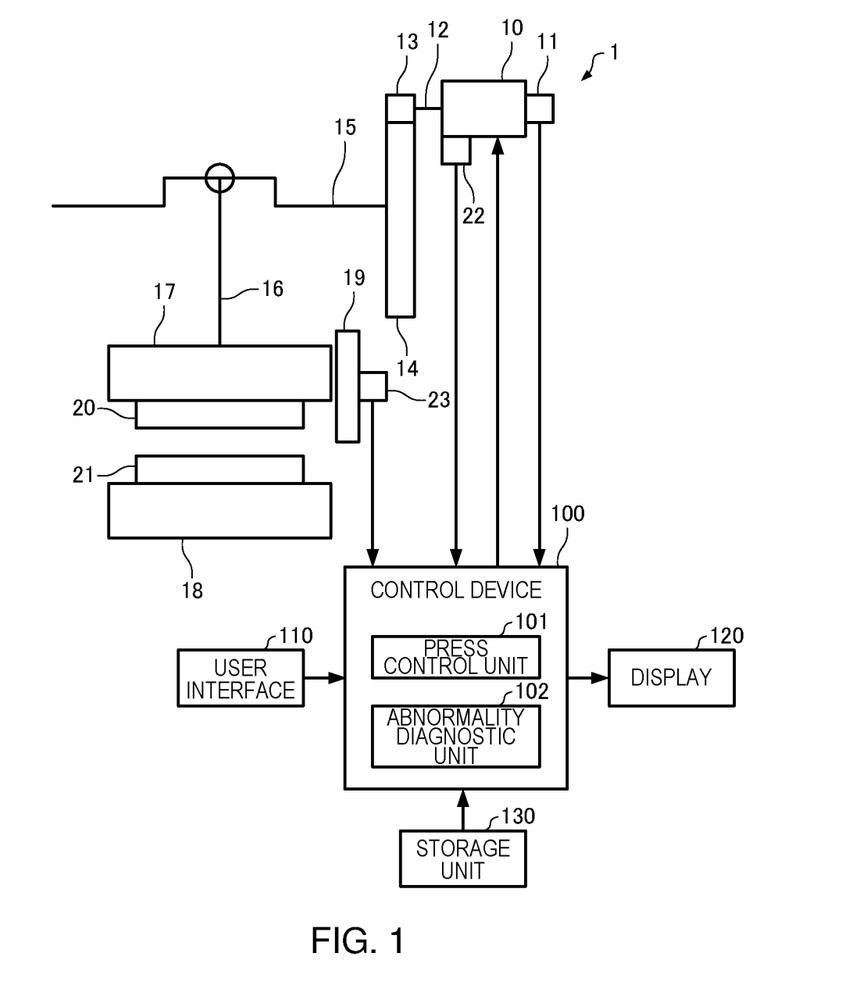
FIG. 1 is a diagram illustrating an example of a configuration of a press machine according to an embodiment of the invention.

FIG. 1 is a diagram illustrating an example of a configuration of a press machine (servo press machine) according to an embodiment of the invention. A press machine 1 converts the rotation of a servo motor 10 into a vertical reciprocating motion (reciprocating linear motion, ascending/descending motion) of a slide 17 by an eccentric mechanism for converting a rotational motion into a linear motion, and performs press working on a workpiece material by utilizing the vertical reciprocating motion of the slide 17. The press machine 1 includes the servo motor 10, an encoder 11, a drive shaft 12, a drive gear 13, a main gear 14, a crank shaft 15, a connecting rod 16, a slide 17, a bolster 18, a control device 100, a user interface 110, a display 120, and a storage unit 130. The press machine is not limited to a servo press machine, and may be, for example, a mechanical press using a flywheel or a linear motion press using a ball screw. In this case, the encoder may be provided at the shaft end of the crank shaft 15 or the shaft end of the ball screw.

The drive shaft 12 is connected to the rotation axis of the servo motor 10, and the drive gear 13 is connected to the drive shaft 12. The main gear 14 is engaged with the drive gear 13, the crank shaft 15 is connected to the main gear 14, and the connecting rod 16 is connected to the crank shaft 15. The rotating shafts such as the drive shaft 12 and the crank shaft 15 are supported by appropriately provided bearings (not illustrated). The crank shaft 15 and the connecting rod 16 form the eccentric mechanism. This eccentric mechanism allows the slide 17 connected to the connecting rod 16 to ascend and descend with respect to the stationary bolster 18. The slide 17 is guided by the slide guide 19. The upper die 20 is attached to the slide 17, and the lower die 21 is attached to the bolster 18. A slide adjustment mechanism (not illustrated) is provided at a connecting portion between the connecting rod 16 and the slide 17. The connecting rod 16 and the slide 17 may be connected to each other through a plunger (not illustrated) without being directly connected. In this case, a plunger guide (not illustrated) for vertically guiding the plunger is provided.

The servo motor 10 is provided with a sensor 22 for detecting vibration of the bearing of the servo motor 10, and the slide guide 19 is provided with a sensor 23 for detecting vibration of the slide guide 19. As the sensors 22 and 23, for example, an acceleration sensor may be used. The data detected by the sensors 22 and 23 are output to the control device 100.

The control device 100 includes a press control unit 101 and an abnormality diagnostic unit 102. The press control unit 101 controls the ascending/descending motion of the slide 17 based on the predetermined slide motion stored in the storage unit 130. More specifically, the press control unit 101 calculates a motor rotation position command value from a command for the position and speed of the slide 17 defined by the slide motion, and controls the rotation position, rotation speed, and current of the servo motor 10 based on the rotation position command. The rotation position of the servo motor 10 is detected by the encoder 11 attached to the servo motor 10.

The press control unit 101 controls the operation of the conveying device (for example, a transfer feeder) for conveying a workpiece material. When the press machine 1 is provided with an automatic die changing device including a means for conveying the dies (upper die 20, lower die 21) and a means for clamping and unclamping the dies, the press control unit 101 controls the operation of the automatic die changing device.

The abnormality diagnostic unit 102 acquires data from sensors 22 and 23 while the slide 17 moves between the bottom dead point and the top dead point at a predetermined speed. Note that the phrase "slide 17 moves between the bottom dead point and the top dead point" may mean that the slide 17 moves from the top dead point to the bottom dead point, that the slide 17 moves from the bottom dead point to the top dead point, that the slide 17 moves from near the top dead point (a predetermined position lower than the top dead point) to near the bottom dead point (a predetermined position higher than the bottom dead point), or that the slide 17 moves from near the bottom dead point to near the top dead point. The position of the slide 17 may be detected from the output of the encoder 11. The abnormality diagnostic unit 102 performs abnormality diagnosis of the press machine 1 based on the data acquired from the sensors 22 and 23, and outputs the diagnostic result to the press control unit 101. The press control unit 101 outputs the diagnostic result to the display 120. The storage unit 130 stores, in advance, data (normal-time data) acquired from the sensors 22 and 23 while the slide 17 moves normally between the bottom dead point and the top dead point at a predetermined speed. The "normal-time" refers to a state in which the press machine is in a new state, such as during a trial run at the time of manufacturing the machine, or when the user is operating the machine with a die attached for the first time after delivery of the machine. The abnormality diagnostic unit 102 performs abnormality diagnosis by comparing the data (measurement data) acquired from the sensors 22 and 23 at the time of diagnosis with the normal-time data. The user can capture a sign of abnormality (seizing, or the like) of the bearing of the servo motor 10 from the diagnostic result of the abnormality diagnosis based on the measurement data from the sensor 22, and can capture a sign of abnormality of the slide guide 19 from the diagnostic result of the abnormality diagnosis based on the measurement data from the sensor 23.

In the press machine 1 of the present embodiment, abnormality diagnosis is executed when a die is changed with no processing load. Specifically, abnormality diagnosis is performed by acquiring data from the sensors 22 and 23 in each of the following timings: when the slide 17 is descended from the top dead point to the bottom dead point to remove a die (current die); when the slide 17 is ascended from the bottom dead point to the top dead point to carry in a next die; when the slide 17 is descended from the top dead point to the bottom dead point to attach the next die; and when the slide 17 is ascended from the bottom dead point to the top dead point to start production.

Figure 2:
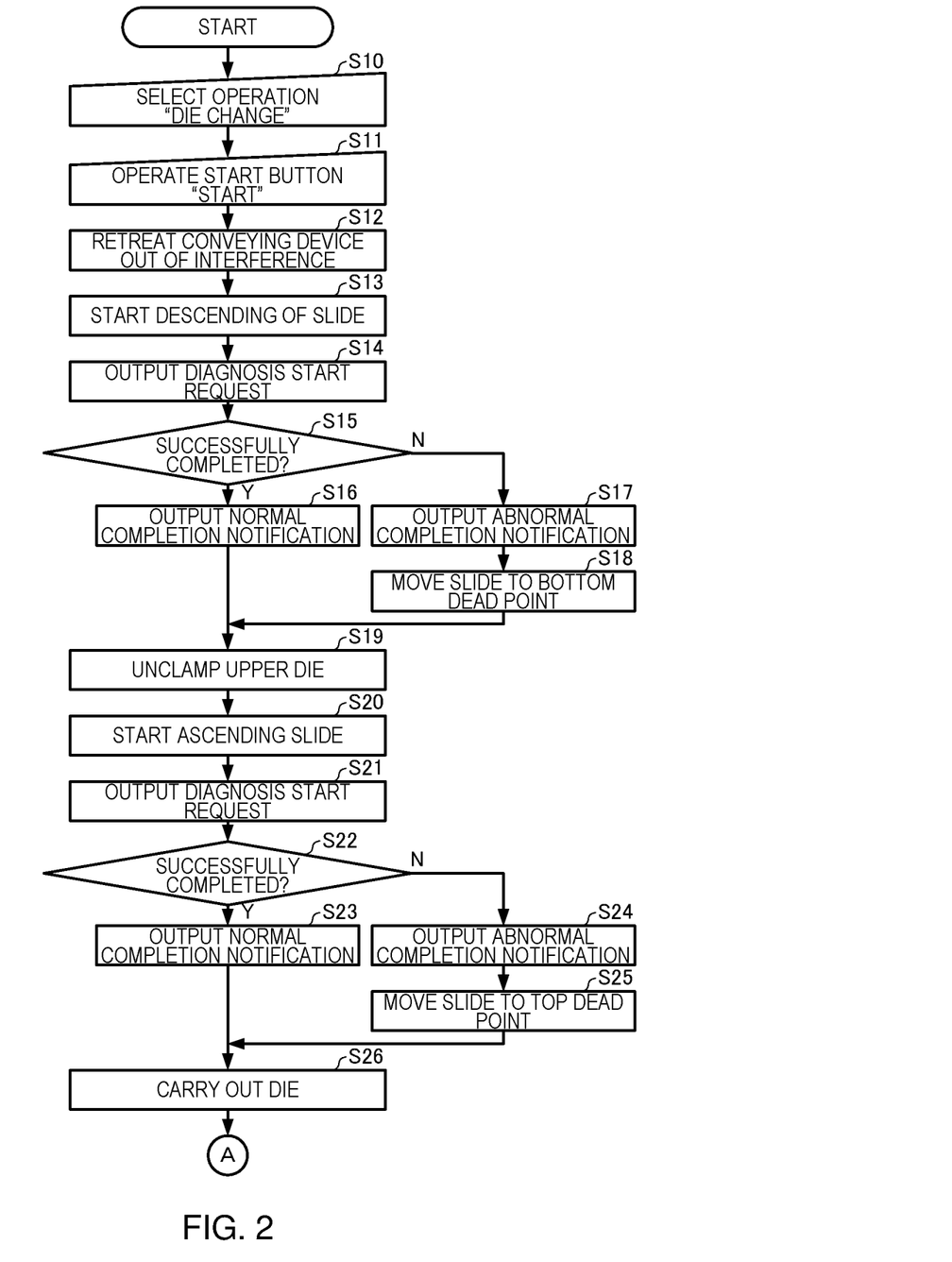
FIG. 2 is a flowchart illustrating a processing flow of a press control unit when a die is changed automatically.
Figure 3:
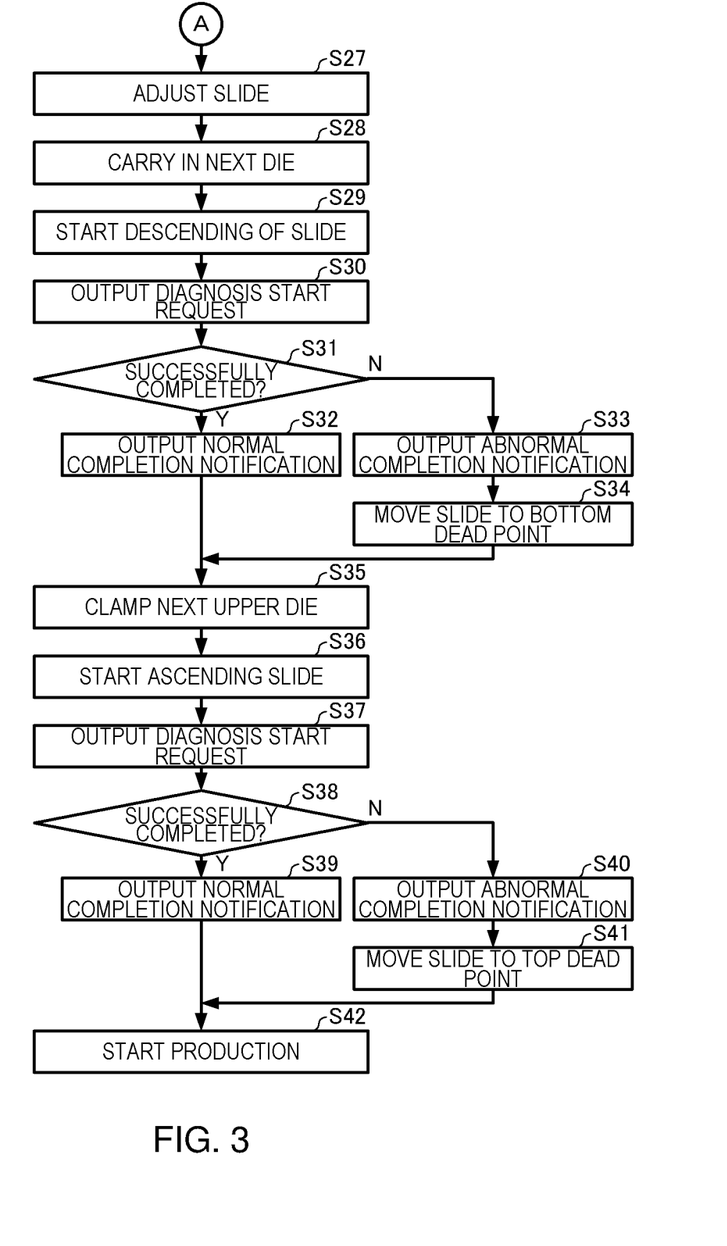
FIG. 3 is a flowchart illustrating a processing flow of the press control unit when a die is changed automatically.
Figure 4:
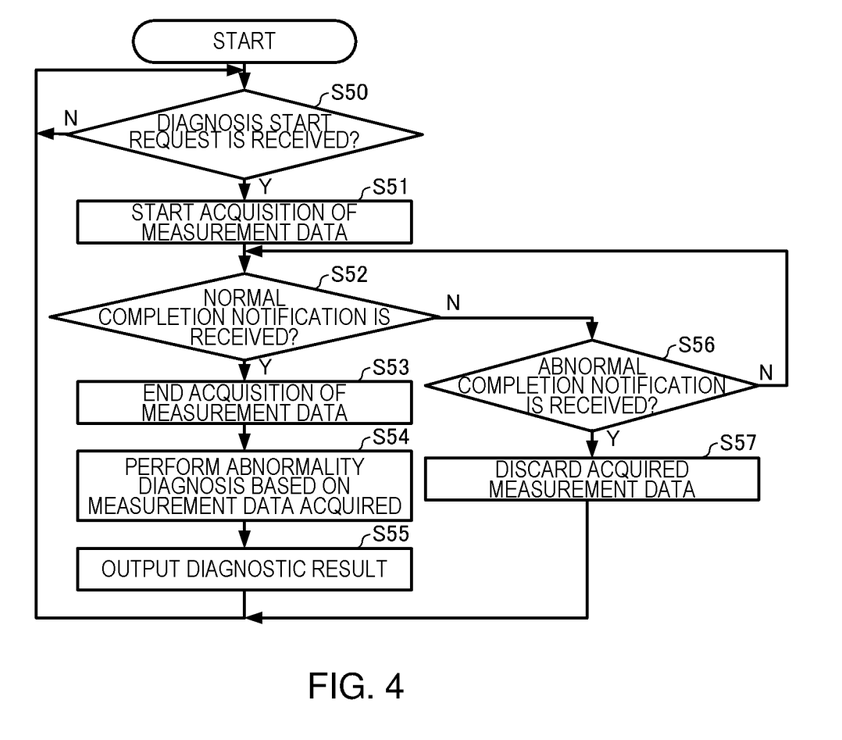
FIG. 4 is a flowchart illustrating a processing flow of an abnormality diagnostic unit when a die is changed automatically.

FIGS. 2 to 4 are flowcharts illustrating the flow of die change processing and abnormality diagnosis processing when die change is automatically performed (when the press machine 1 is provided with the automatic die changing device). FIGS. 2 and 3 are flowcharts illustrating the processing flow of the press control unit 101. FIG. 4 a flowchart illustrating the processing flow by the abnormality diagnostic unit 102. It is assumed that the slide 17 is stopped at the top dead point at the start of die change.

When the operation of "die change" (step S10 in FIG. 2) is selected by the user in the user interface 110, and a start button "start" is operated (step S11), the press control unit 101 performs control for retreating the conveying device out of the interference (step S12). Next, the press control unit 101 starts descending the slide 17 (step S13) and outputs a diagnosis start request to the abnormality diagnostic unit 102 (step S14). Next, the press control unit 101 determines whether the descending of the slide 17 is normally completed (the slide 17 moves from the top dead point to the bottom dead point at a predetermined speed and stops at the bottom dead point) (step S15). Then, when the descending is normally completed (Y in step S15), the press control unit 101 outputs a normal completion notification to the abnormality diagnostic unit 102 (step S16). Alternatively, when the descending is not normally completed (for example, when the slide 17 is stopped before the bottom dead point by the user's operation) (N in step S15), the press control unit 101 outputs an abnormal completion notification to the abnormality diagnostic unit 102 (step S17), and moves the slide 17 to the bottom dead point and stops it (step S18).

When receiving the diagnosis start request (Y of step S50 in FIG. 4), the abnormality diagnostic unit 102 starts acquiring data (measurement data) from the sensors 22 and 23 (step S51). Next, the abnormality diagnostic unit 102 determines whether the normal completion notification is received (step S52), and when the normal completion notification is received (Y of step S52), the acquisition of measurement data is completed (step S53), the acquired measurement data is compared with the normal-time data to perform abnormality diagnosis (step S54), and a result of the diagnosis is output to the press control unit 101 (step S55). When the normal completion notification is not received (N in step S52), the abnormality diagnostic unit 102 determines whether the abnormal completion notification is received (step S56), and when the abnormal completion notification is received (Y in step S56), the acquired measurement data is discarded (step S57), and a diagnostic result is not output.

Figure 5:
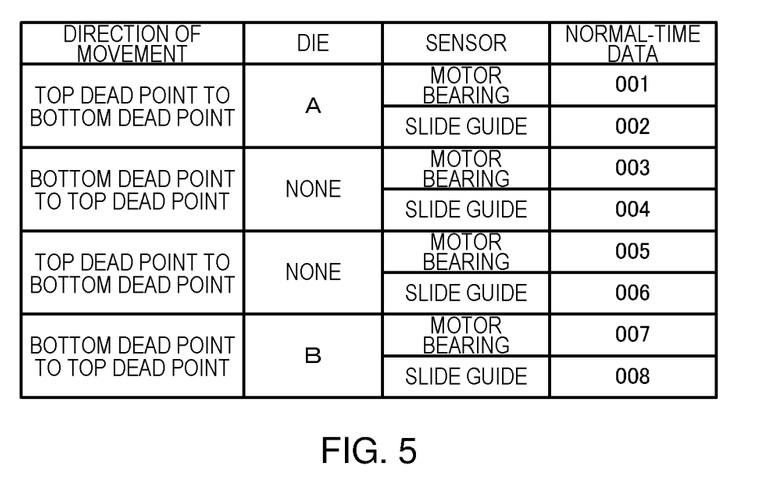
FIG. 5 is a table illustrating an example of normal-time data.

Here, as listed in FIG. 5, the storage unit 130 stores normal-time data for each moving direction (movement from the top dead point to the bottom dead point, movement from the bottom dead point to the top dead point), the presence/absence and type of dies, and the type of sensors (the sensor 22 for detecting vibration of the motor bearing, and the sensor 23). In the example illustrated in FIG. 5, the normal-time data "001" is data acquired from the sensor 22 normally while the slide 17 moves from the top dead point to the bottom dead point with a die "A" attached and the normal-time data "002" is data acquired from the sensor 23 under the similar condition, the normal-time data "003" is data acquired from the sensor 22 normally while the slide 17 to which no die is attached moves from the bottom dead point to the top dead point and the normal-time data "004" is data acquired from the sensor 23 under the similar condition, the normal-time data "005" is data acquired from the sensor 22 normally while the slide 17 to which no die is attached moves from the top dead point to the bottom dead point and the normal-time data "006" is data acquired from the sensor 23 under the similar condition, and the normal-time data "007" is the data acquired from sensor 22 normally while the slide 17 to which a die "B" is attached moves from the bottom dead point to the top dead point and the normal-time data "008" is the data acquired from the sensor 23 under the similar condition.

Assuming that an upper die "A" is attached to the slide 17 that starts descending in step S13, in step S54, the abnormality diagnostic unit 102 compares measurement data (data acquired by the sensor 22 while the slide 17 to which the die "A" is attached moves from the top dead point to the bottom dead point) from the sensor 22 which has started data acquisition in diagnosis start request (step S14) and has ended the data acquisition with the normal completion notification (step S16), with the normal-time data "001" in FIG. 5 acquired under the same measurement conditions, to perform abnormality diagnosis. Then, the abnormality diagnostic unit 102 also compares measurement data (data acquired by the sensor 23 while slide 17 to which the die "A" is attached moves from the top dead point to the bottom dead point) from the sensor 23, which has been acquired in the same manner, with the normal-time data "002" in FIG. 5 to perform abnormality diagnosis. The measurement data and the normal-time data are time-series data of sensor values. In the abnormality diagnosis, for example, a plurality of intervals are set for each of the measurement data and the normal-time data, and the difference between them is obtained for each interval. Then, when there are a predetermined number or more of intervals in which the difference between them is equal to or greater than a predetermined value, it is diagnosed that there is an abnormality, and in other cases, diagnosed that there is no abnormality. The measurement data and the normal-time data are subjected to a Fast Fourier Transform (FFT) to determine the difference between them for each frequency band. Then, when there are a predetermined number or more of frequency bands in which the difference between them is equal to or greater than a predetermined value, it is diagnosed that there is an abnormality, and in other cases, diagnosed that there is no abnormality. Further, machine learning (supervised learning) may be performed on the normal-time data and the FFT analysis results of the normal-time data to generate a learned model, and abnormality diagnosis may be performed by inputting the measurement data into the learned model.

Referring back to the description of FIG. 2, the press control unit 101 controls the automatic die changing device to unclamp the upper die 20 (die "A") after outputting the normal completion notification in step S16 or stopping the slide 17 at the bottom dead point in step S18 (step S19). Next, the press control unit 101 starts ascending the slide 17 (step S20) and outputs a diagnosis start request to the abnormality diagnostic unit 102 (step S21). Next, the press control unit 101 determines whether ascending of the slide 17 is normally completed (the slide 17 moves from the bottom dead point to the top dead point at a predetermined speed and stops at the top dead point) (step S22). Then, when the ascending is normally completed (Y in step S22), the press control unit 101 outputs a normal completion notification to the abnormality diagnostic unit 102 (step S23). Alternatively, when the ascending is not normally completed (for example, when the slide 17 is stopped before the top dead point by the user's operation) (N in step S22), the press control unit 101 outputs an abnormal completion notification to the abnormality diagnostic unit 102 (step S24) and moves the slide 17 to the top dead point and stops it (step S25).

The processing by the abnormality diagnostic unit 102 at this time is as illustrated in FIG. 4. In step S54, the abnormality diagnostic unit 102 compares the measurement data (data acquired by the sensor 22 while the slide 17 to which no die is attached moves from the bottom dead point to the top dead point) from the sensor 22 which has started data acquisition in the diagnosis start request (step S21) and has ended the data acquisition in the normal completion notification (step S23), with the normal-time data "003" in FIG. 5, to perform the abnormality diagnosis. Then, the abnormality diagnostic unit 102 also compares the measurement data (data acquired by the sensor 23 while slide 17 to which no die is attached moves from the bottom dead point to the top dead point), which has been acquired in the same manner, from the sensor 23, with the normal-time data "004" in FIG. 5 to perform the abnormality diagnosis.

Referring back to the description of FIG. 2, after outputting the normal completion notification in step S23 or stopping the slide 17 at the top dead point in step S25, the press control unit 101 controls the automatic die changing device to carry out the die "A" (step S26), adjust the slide to the height of the next die (step S27 in FIG. 3), and carry in the next die (referred to as the die "B") (step S28). Next, the press control unit 101 starts descending the slide 17 (step S29) and outputs a diagnosis start request to the abnormality diagnostic unit 102 (step S30). Next, the press control unit 101 determines whether the descending of the slide 17 is normally completed (step S31). Then, when the descending is normally completed (Y in step S31), the press control unit 101 outputs a normal completion notification to the abnormality diagnostic unit 102 (step S32). Alternatively, when the descending is not normally completed (N in step S31), the press control unit 101 outputs an abnormal completion notification to the abnormality diagnostic unit 102 (step S33) and moves the slide 17 to the bottom dead point and stops it (step S34).

The processing by the abnormality diagnostic unit 102 at this time is as illustrated in FIG. 4. In step S54, the abnormality diagnostic unit 102 compares the measurement data (data acquired by the sensor 22 while the slide 17 to which no die is attached normally moves from the top dead point to the bottom dead point) from the sensor 22, which has started data acquisition in the diagnosis start request (step S30) and has ended the data acquisition with the normal completion notification (step S32), with the normal-time data "005" in FIG. 5, to perform the abnormality diagnosis. Then, the abnormality diagnostic unit 102 also compares the measurement data (data acquired by the sensor 23 while slide 17 to which no die is attached normally moves from the top dead point to the bottom dead point), which has been acquired in the same manner, from the sensor 23, with the normal-time data "006" in FIG. 5 to perform abnormality diagnosis.

Referring back to the description of FIG. 3, the press control unit 101 controls the automatic die changing device to clamp the next upper die 20 (die "B") after outputting the normal completion notification in step S32 or stopping the slide 17 at the bottom dead point in step S34 (step S35). Next, the press control unit 101 starts ascending the slide 17 (step S36) and outputs a diagnosis start request to the abnormality diagnostic unit 102 (step S37). Next, the press control unit 101 determines whether the ascending of the slide 17 is normally completed (step S38). Then, when the ascending is normally completed (Y in step S38), the press control unit 101 outputs a normal completion notification to the abnormality diagnostic unit 102 (step S39). Alternatively, when the ascending is not normally completed (N of step S38), the press control unit 101 outputs an abnormal completion notification to the abnormality diagnostic unit 102 (step S40) and moves the slide 17 to the top dead point and stops it (step S41).

The processing by the abnormality diagnostic unit 102 at this time is as illustrated in FIG. 4. In step S54, the abnormality diagnostic unit 102 compares the measurement data (data acquired by the sensor 22 while the slide 17 to which the die "B" is attached moves from the bottom dead point to the top dead point) from the sensor 22 which has started data acquisition in a diagnosis start request (step S37) and has ended the data acquisition with the normal completion notification (step S39), with the normal-time data "007" in FIG. 5, to perform the abnormality diagnosis. Then, the abnormality diagnostic unit 102 also compares measurement data (data acquired by the sensor 23 while the slide 17 to which the die "B" is attached moves from the bottom dead point to the top dead point), which has been acquired in the same manner, from the sensor 23, with the normal-time data "008" in FIG. 5 to perform the abnormality diagnosis.

Referring back to the description of FIG. 3, the press control unit 101 starts production after outputting the normal completion notification in step S39 or stopping the slide 17 at the top dead point in step S41 (step S42).

Figure 6:
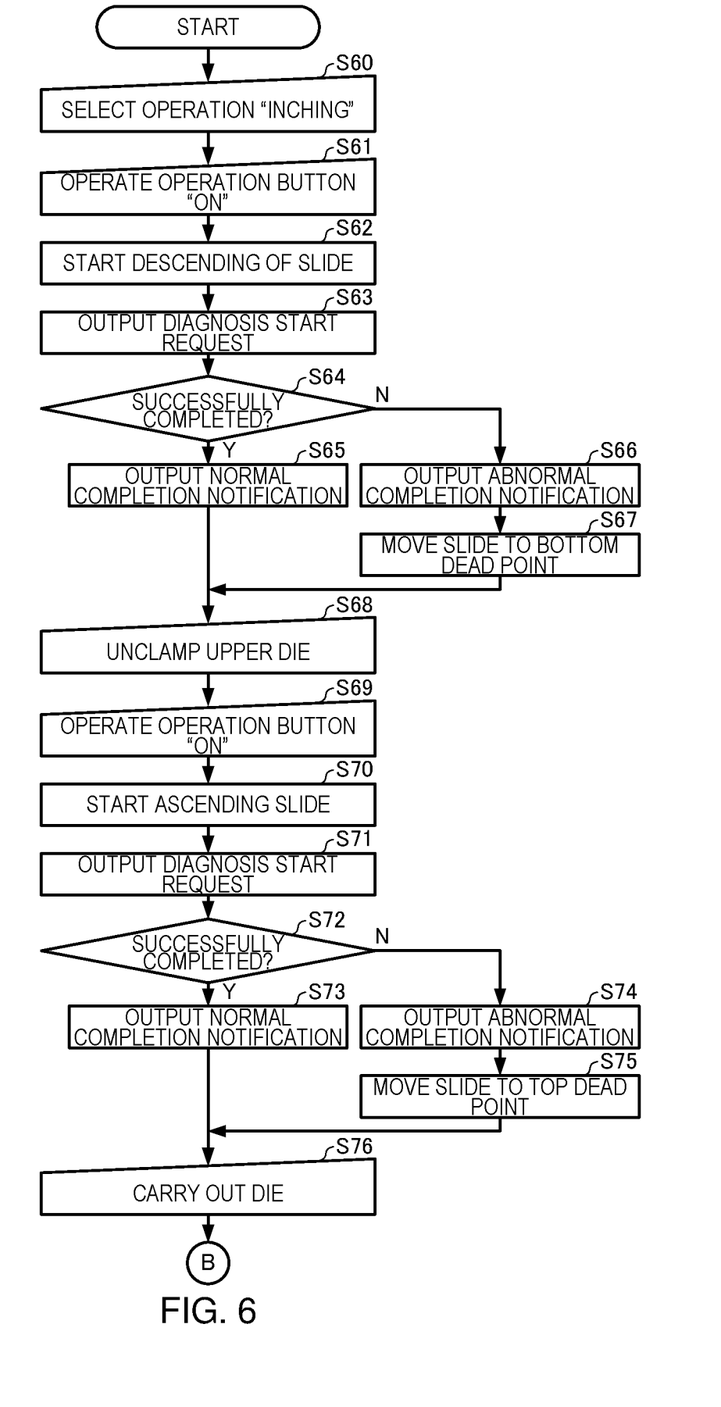
FIG. 6 is a flowchart illustrating a processing flow of a press control unit when a die is changed manually.
Figure 7:
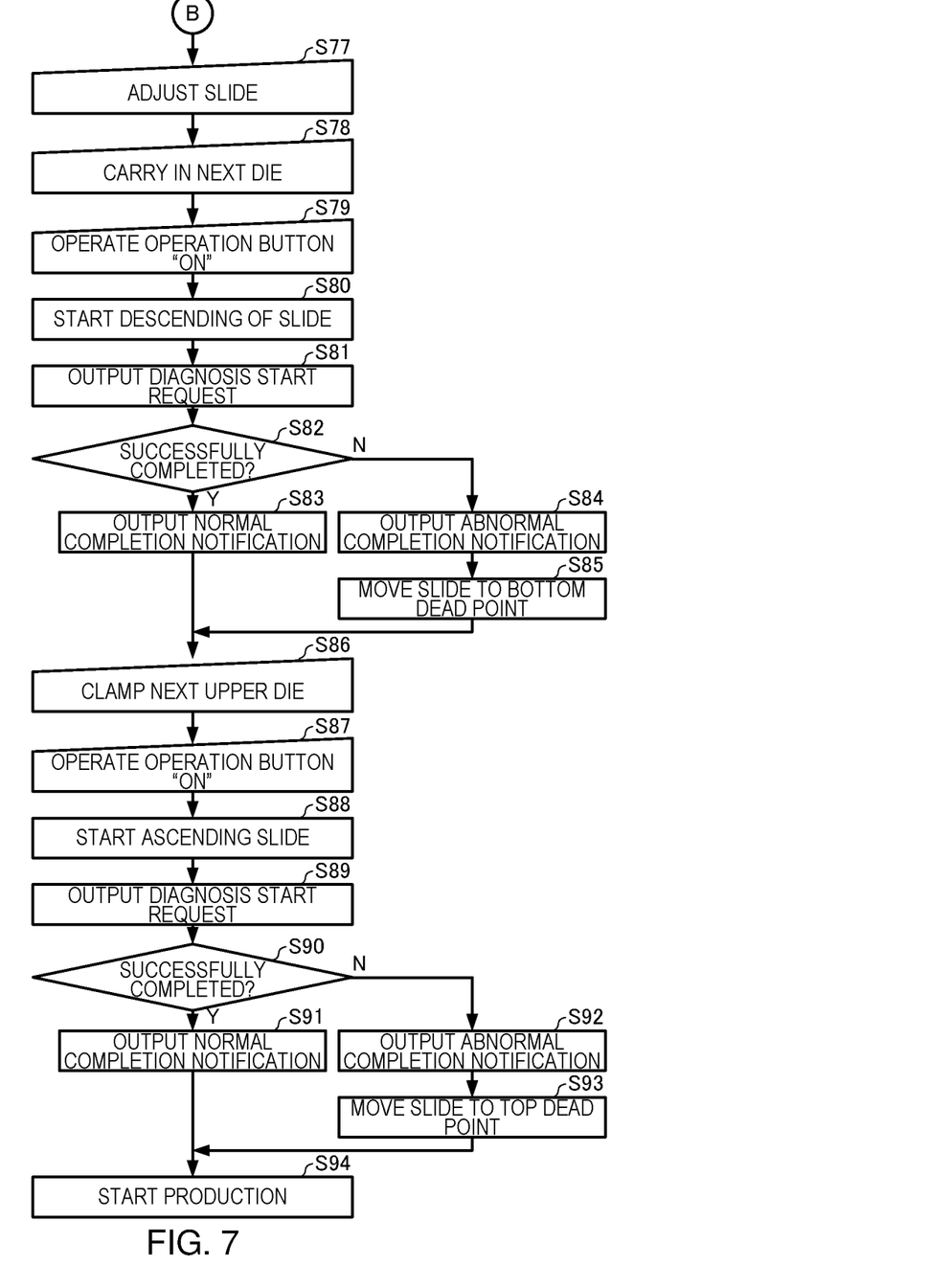
FIG. 7 is a flowchart illustrating a processing flow of the press control unit when a die is changed manually.

FIGS. 6 and 7 are flowcharts illustrating the processing flow of a press control unit 101 when die change is performed manually. The processing of the abnormality diagnostic unit 102 is the same as the processing in the case where die change is performed automatically (FIG. 4), and thus a description thereof will be omitted. In addition, with respect to the processing of the press control unit 101, the same processing as those in the case of performing the die change automatically will be appropriately omitted.

When the user selects the operation of "inching" in the user interface 110 (step S60) and operates the operation button "ON" (step S61), the press control unit 101 starts descending the slide 17 (step S62) and outputs a diagnosis start request to the abnormality diagnostic unit 102 (step S63). Steps S64 to S67 are the same as steps S15 to S18 in FIG. 2, and thus description thereof is omitted.

Next, when the user unclamps the upper die 20 (die "A") (step S68) and operates the operation button "ON" (step S69), the press control unit 101 starts ascending the slide 17 (step S70) and outputs a diagnosis start request to the abnormality diagnostic unit 102 (step S71). Steps S72 to S75 are the same as steps S22 to S25 in FIG. 2, and thus description thereof is omitted.

Next, the user carries out the die "A" (step S76), performs slide adjustment according to the height of the next die (step S77 in FIG. 7), and carries in the next die (referred to as the die "B") (step S78). Then, when the operation button "ON" is operated (step S79), the press control unit 101 starts descending the slide 17 (step S80), and outputs a diagnosis start request to the abnormality diagnostic unit 102 (step S81). Steps S82 to S85 are the same as steps S31 to S34 in FIG. 3, and thus description thereof is omitted.

Next, when the user clamps the upper die 20 (die "B") (step S86) and operates the operation button "ON" (step S87), the press control unit 101 starts ascending the slide 17 (step S88) and outputs a diagnosis start request to the abnormality diagnostic unit 102 (step S89). Steps S90 to S94 are the same as steps S38 to S42 in FIG. 3, and thus description thereof is omitted.

According to the present embodiment, the abnormality diagnosis is performed when a die is changed with no load is applied during processing, based on the measurement data acquired from the sensors 22 and 23 when the slide 17 moves (the slide 17 is descended to remove the die, the slide 17 is ascended to carry in the next die, the slide 17 is descended to mount the next die, the slide 17 is ascended to start production) in accordance with the die change. This enables to eliminate the influence of disturbance and improve the diagnostic accuracy of the abnormality diagnosis without imposing the workload for the abnormality diagnosis on the user.

In addition, according to the present embodiment, by performing the abnormality diagnosis in each of the four situations in which the combination of the moving direction of the slide 17 and the presence/absence of the die is different, it is possible to more easily capture the sign of abnormality. The abnormality diagnosis may be performed only in some of the four situations. For example, by performing only the abnormality diagnosis based on the measurement data acquired while the slide 17 to which no die is attached moves at a predetermined speed from the top dead point to the bottom dead point (or from the bottom dead point to the top dead point) and not performing the abnormality diagnosis based on the measurement data acquired while the slide 17 to which the die is attached moves at a predetermined speed from the top dead point to the bottom dead point (or from the bottom dead point to the top dead point), it is not necessary to prepare normal-time data for each die type in advance.

The sensor used in the abnormality diagnosis is not limited to the bearing of the servo motor and the slide guide, and may be provided in other rotary sliding parts such as a bearing supporting a crank shaft of the press machine, or other reciprocating sliding parts such as a plunger guide. The sensor used in the abnormality diagnosis is not limited to a sensor for detecting vibration, and may be, for example, a sensor for measuring a current value of the servo motor 10 (current sensor for detecting the output current of a servo amplifier) or a sensor for measuring the sound generated in the sliding parts (motor bearing, slide guide, or the like) of the press machine 1.

With respect to attaching of the sensor, the sensor may be mounted in the radial and thrust directions with respect to the shaft when the sliding part to be diagnosed is a rotating part such as a bearing. When the sliding part to be diagnosed is a reciprocating linear sliding part such as a slide guide, the sensors may be attached to the slide guide or the frame in contact with the slide guide in the X-axis, Y-axis, and Z-axis direction respectively.

The main purpose is to make a diagnosis automatically at the time of die change. However, when a worker feels discomfort during production (when he/she finds that the sound and vibration, or the like differ from the normal state), the same abnormality diagnosis may be made as long as the die is attached or detached, and there is no disturbance in operation.

Some embodiments of the invention have been described in detail above, but a person skilled in the art will readily appreciate that various modifications can be made from the embodiments without materially departing from the novel teachings and effects of the invention.

What is claimed is:

1. A press machine that converts a rotation of a motor into a reciprocating linear motion of a slide and performs press working on a workpiece material, the press machine comprising:
   a press control unit that controls ascending/descending motion of the slide; and
   an abnormality diagnostic unit configured to perform abnormality diagnosis of the press machine based on data from a sensor provided in the press machine and to output a result of the abnormality diagnosis,
   the abnormality diagnostic unit being configured to perform the abnormality diagnosis based on the data acquired from the sensor while the slide moves at a predetermined speed between a bottom dead point and a top dead point in a press-no-load state.

2. The press machine according to claim 1, wherein
   the abnormality diagnostic unit is configured to perform the abnormality diagnosis at a time of die change, based on at least one of:
   data acquired from the sensor while the slide, to which a die is attached, moves at a predetermined speed from the top dead point to the bottom dead point;
   data acquired from the sensor while the slide, to which no die is attached, moves at a predetermined speed from the bottom dead point to the top dead point;
   data acquired from the sensor while the slide, to which no die is attached, moves at a predetermined speed from the top dead point to the bottom dead point; and
   data acquired from the sensor while the slide, to which a die is attached, moves at a predetermined speed from the bottom dead point to the top dead point.

3. The press machine according to claim 1, wherein
   the press control unit is configured to output an abnormal completion notification to the abnormality diagnostic unit when movement of the slide is not completed normally, and
   the abnormality diagnostic unit is configured not to output the result of the abnormality diagnosis when the abnormal completion notification has been received.

4. The press machine according to claim 1, wherein
   the abnormality diagnostic unit is configured to perform the abnormality diagnosis, based on:
   data previously acquired from the sensor while the slide moved normally between the bottom dead point and the top dead point at a predetermined speed; and
   data acquired from the sensor at the time of die change.

5. The press machine according to claim 1, wherein
   the sensor is a sensor configured to detect vibration of a bearing of the motor.

6. The press machine according to claim 1, wherein
   the sensor is a sensor configured to detect vibration of a slide guide that guides the slide.

7. A method for diagnosing abnormality of a press machine that converts a rotation of a motor into a reciprocating linear motion of a slide and performs press working on a workpiece material, the method comprising:
   a press control step of controlling ascending/descending motion of the slide; and
   an abnormality diagnosis step of performing abnormality diagnosis of the press machine based on data from a sensor provided in the press machine and outputting a result of the abnormality diagnosis,
   in the abnormality diagnosis step, the abnormality diagnosis being performed based on the data acquired from the sensor while the slide moves at a predetermined speed between a bottom dead point and a top dead point in a press-no-load state.

* * * * *